United States Patent [19]

Sicher

[11] Patent Number: 5,355,515
[45] Date of Patent: Oct. 11, 1994

[54] METHOD AND APPARATUS FOR ESTIMATING INITIAL TIME ALIGNMENT IN A CELLULAR COMMUNICATIONS NETWORK

[75] Inventor: Alan Sicher, Garland, Tex.

[73] Assignee: Telefonaktiebolaget L M Ericsson, Stockholm, Sweden

[21] Appl. No.: 713,853

[22] Filed: Jun. 12, 1991

[51] Int. Cl.$^5$ .............................................. H04B 7/26
[52] U.S. Cl. .................... 455/33.2; 455/34.1; 455/51.1; 455/54.1; 455/56.1; 379/60
[58] Field of Search ............... 455/33, 34, 54, 56, 455/51, 33.1-33.6, 34.1, 54.1, 54.2, 56.7, 51.1-51.2; 370/95.3, 60, 94.1, 103, 104.1, 95.1, 95.3, 108; 379/63, 59, 60

[56] References Cited

U.S. PATENT DOCUMENTS

| | | |
|---|---|---|
| 3,593,138 | 9/1970 | Kobayashi et al. |
| 4,414,661 | 11/1983 | Karlstrom ............................. 370/95 |
| 4,472,802 | 9/1984 | Pin et al. ............................. 370/108 |
| 4,475,010 | 10/1984 | Huensch et al. ...................... 455/33 |
| 4,608,711 | 8/1986 | Goldman ............................. 455/33 |
| 4,642,806 | 2/1987 | Hewitt et al. ...................... 370/95.3 |
| 4,694,453 | 7/1987 | Dunn et al. ........................ 370/85 |
| 4,696,027 | 9/1987 | Bonta ............................... 379/60 |
| 4,765,753 | 8/1988 | Schmidt ............................. 379/60 |
| 4,797,947 | 1/1989 | Labedz ............................. 455/33 |
| 4,811,380 | 3/1989 | Spear ............................... 379/60 |
| 4,866,710 | 9/1989 | Schaeffer .......................... 370/95.1 |
| 5,042,082 | 8/1991 | Dahlin ............................. 455/33 |

FOREIGN PATENT DOCUMENTS 0090441 5/1985 Japan ............................. 455/33.2

OTHER PUBLICATIONS

Masaharu Mata, Empirical Formula for Propagational Loss in Land Mobile Radio Services, Aug. 1980, All.
GSM Recommendation 05.10 Version 3,5.0, "Radio Sub-System Synchronization", Jan., 1991.
EIA Project No. 2215, IS-54, "Cellular System, Dual-Mode Subscriber Equipment—Network Equipment Compatibility Specification", Dec., 1989, pp. 2-5-6-2-58.

Primary Examiner—Reinhard J. Eisenzopf
Assistant Examiner—Chi Pham
Attorney, Agent, or Firm—Burns, Doane, Swecker & Mathis

[57] ABSTRACT

A method and apparatus for use in a cellular mobile radio telephone system for initially setting a time alignment parameter in a mobile station. The method comprises the steps of estimating an optimal time alignment parameter for use during communication on a new traffic channel of a desired base station based on information available before the communication on the traffic channel is established, sending the estimated time alignment parameter to the mobile station, and setting the time alignment value in the mobile in accordance with the estimated time alignment parameter. An apparatus for initially setting a time alignment parameter is also provided according to a preferred embodiment.

16 Claims, 11 Drawing Sheets

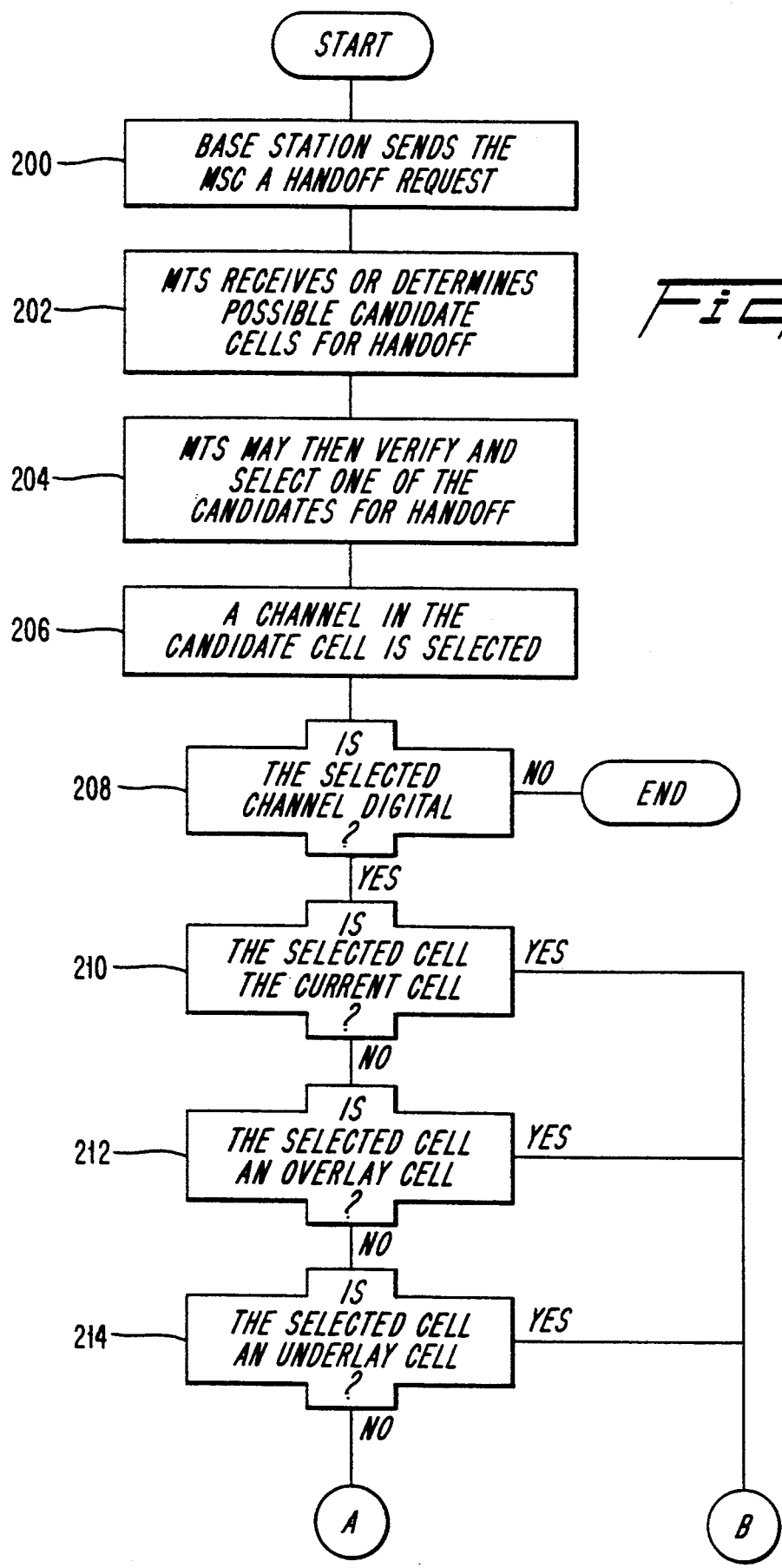

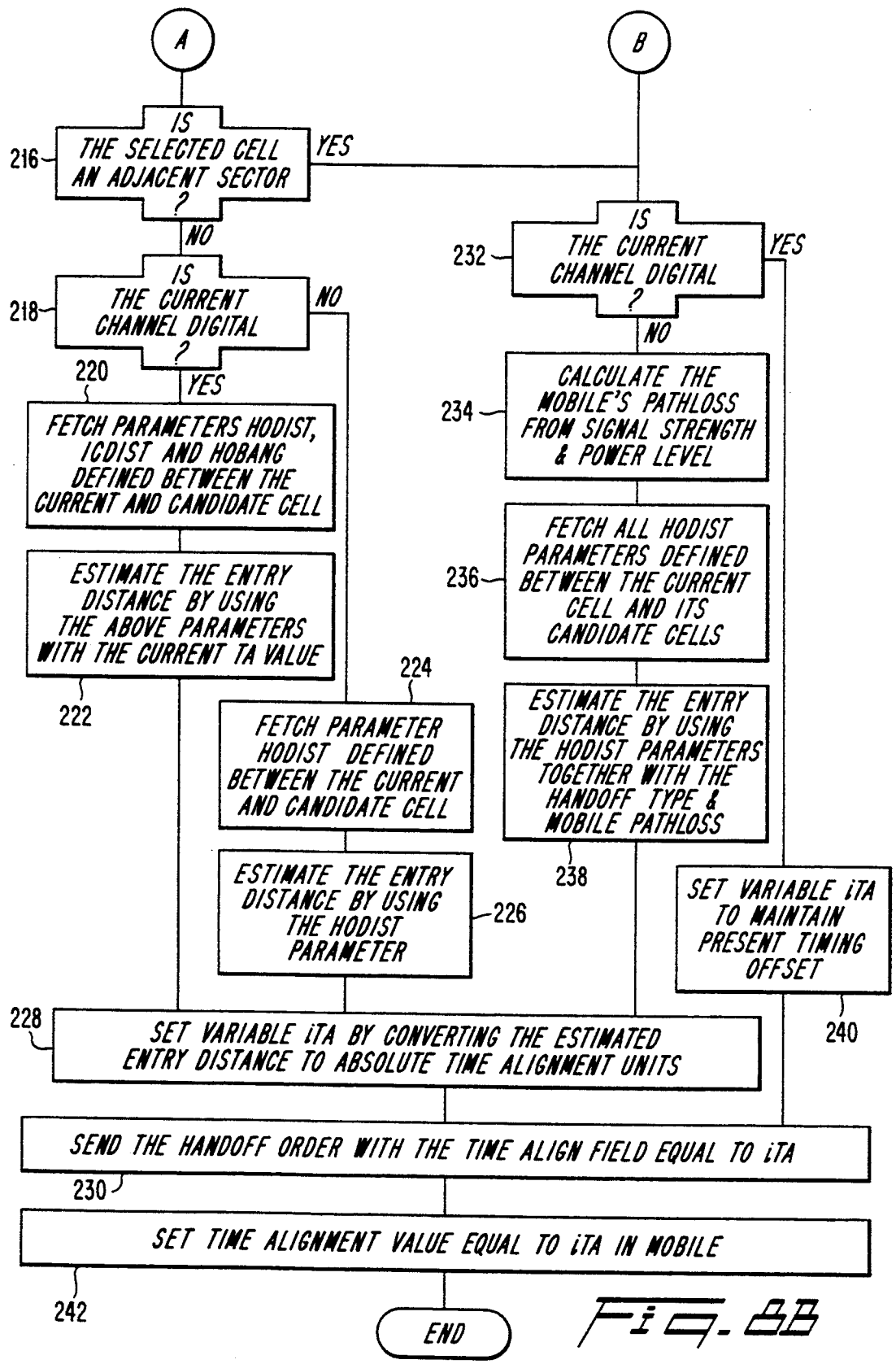

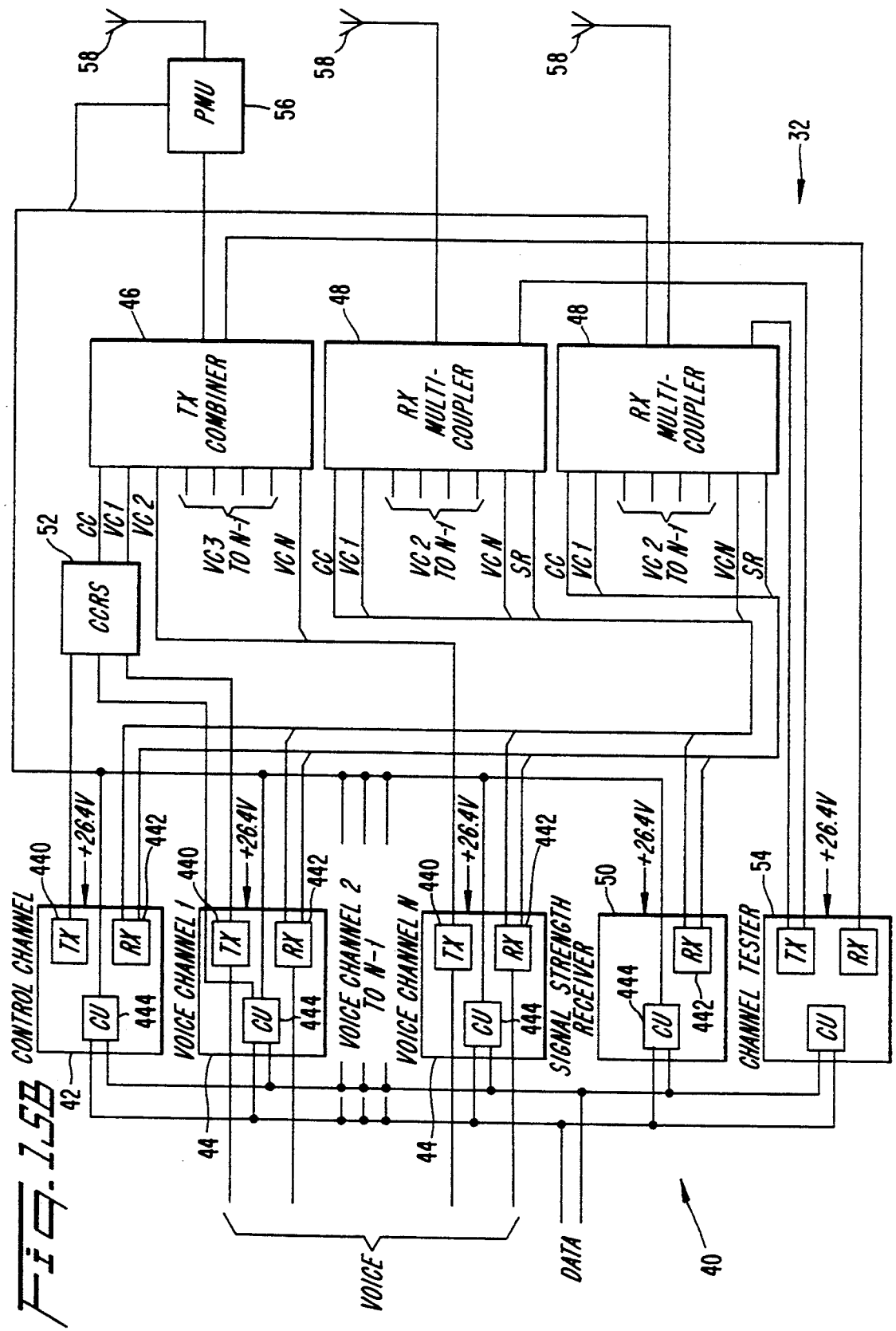

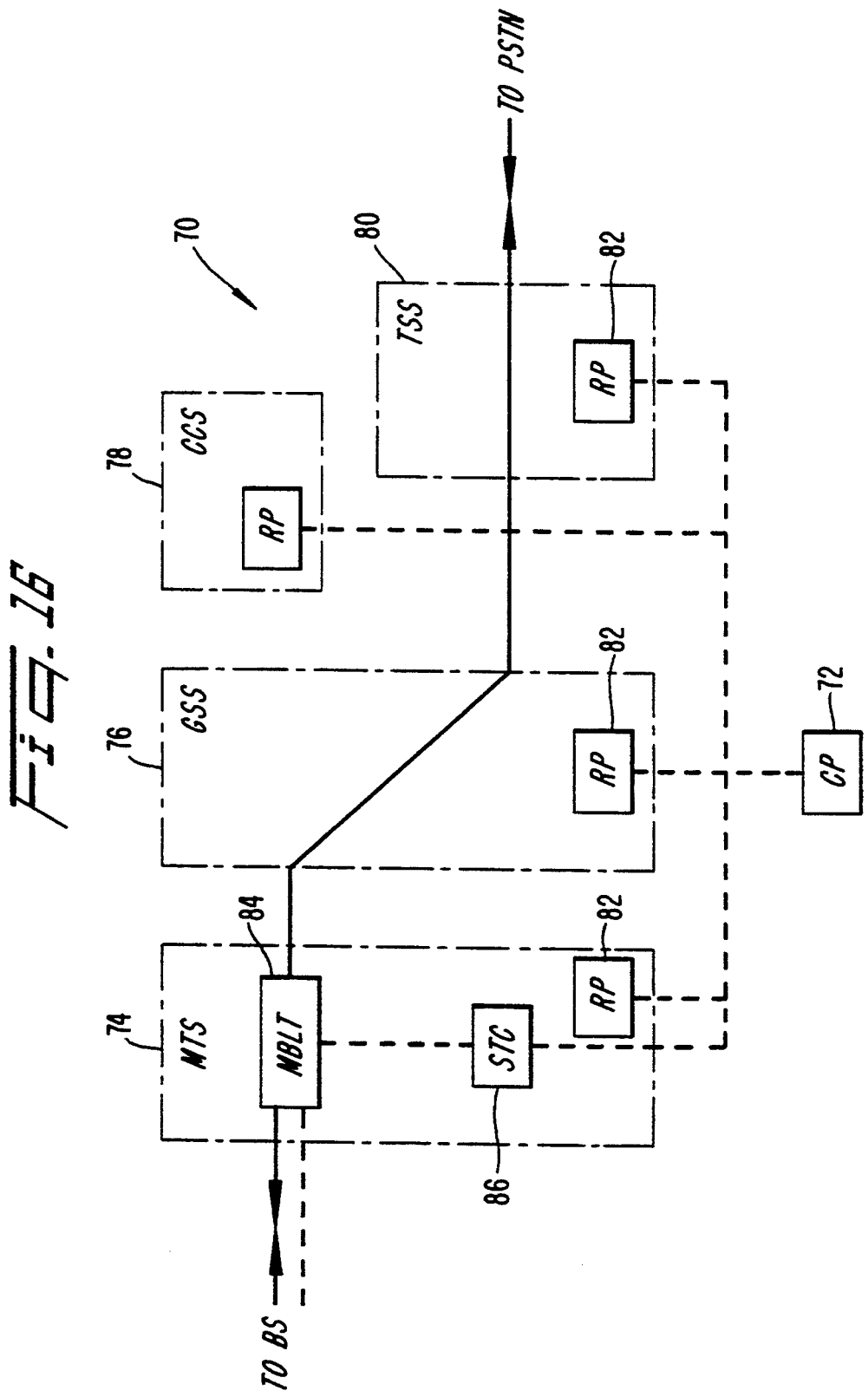

METHOD AND APPARATUS FOR ESTIMATING INITIAL TIME ALIGNMENT IN A CELLULAR COMMUNICATIONS NETWORK

FIELD OF THE INVENTION

The present invention relates to the estimation of an initial time alignment parameter in cellular mobile radio systems. More particularly, the present invention is directed to a method and apparatus for estimating the initial time alignment parameter when setting up a call or a handoff of the mobile station to a new base station in a cellular mobile radio system.

BACKGROUND OF THE INVENTION

Time alignment is the process of controlling the time of TDMA time slot burst transmission from the mobile station by advancing or retarding the mobile transmit burst so that it arrives at the base station receiver in a proper time relationship to other time slot burst transmissions. Time alignment applies to TDMA channels in the direction from mobile to base station. An error in time alignment may cause the arrival of signals from two different mobile transmitters simultaneously at the base station receiver. This in turn causes errors in both signals. This overlap can occur at the beginning or end of a time slot. Upon detecting an overlap condition, the base station sends an appropriate time alignment message to the mobile station using the appropriate forward control signaling channel.

According to the Section of the IS-54, December 1989, defining system access, the mobile station receives an initial traffic channel designation message and seizes a traffic channel. The mobile station transmits a shortened time slot burst at a predetermined time until it receives a time alignment message from the base station or the mobile station is directed to stop transmission due to other considerations. The burst sent by the mobile is artificially shortened in order to reduce the chances for signal overlap. If the mobile station receives a time alignment message, it adjusts its transmission timing and transmits during the next available slot a time-aligned, full duration slot burst.

Thus, the time alignment parameter is initially reset to zero and adjusted to an optimal value in typically about one to four seconds. By the time the alignment parameter is adjusted, a number of bit errors may have already occurred due to burst overlap.

At handoff of a mobile station to a new base station, the distance between the mobile station and the (currently active) base station which coordinates communications with that mobile changes abruptly, requiring a change of the absolute time alignment offset parameter in the mobile station. At handoff, the time alignment offset parameter is either reset to zero which is the value associated with the mobile station being near the base station, or the old time alignment offset parameter is not modified. Then, the time alignment parameter is adjusted by measuring the time when a burst is received at the new base station, based on the sync pattern in the burst, and a change of the time alignment offset parameter is ordered responsive to this measurement. This change typically takes about one to four seconds. During this delay, there is an increased probability of disturbing other time slots due to burst overlapping.

SUMMARY OF THE INVENTION

In order to overcome the disadvantages noted with conventional procedures, a preferred embodiment of the present invention is directed to a method in a mobile radio system for initially setting a time alignment parameter in a mobile station comprising the steps of estimating an optimal time alignment parameter for use during communication on a new traffic channel of a desired base station based on information available before the communication is established, and sending the estimated time alignment parameter to the mobile station. According to one embodiment, the estimation is performed upon receipt of a handoff request and the estimated time alignment parameter is sent with the handoff order. According to another embodiment, the estimation is performed upon receipt of an access request or page response and the estimated time alignment parameter is sent with a physical layer control message immediately on the new traffic channel.

According to embodiment of the present invention the information available used to estimate the optimal time alignment parameter is at least one of the following values: a handoff boundary angle value, a handoff distance value, a total distance value or a current time alignment value. Additionally, pathloss may be used in the time alignment estimation.

According to a preferred embodiment of the present invention, an apparatus is provided in a mobile radio station having a plurality of cells, for initially setting a time alignment parameter in a mobile station. The apparatus comprises means for estimating an optimal time alignment parameter for use during communication on a desired traffic channel of a desired cell based on information available before the communication is established, and means for sending the estimated time alignment parameter to the mobile station.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The present invention will now be described in more detail with reference to the preferred embodiments of the device, given only by way of example, and with reference to the accompanying drawings, in which:

FIGS. 8A and 8B are flowcharts illustrating methods according to one embodiment of the present invention;

FIGS. 15A and 15B are block diagrams illustrating a base station in a cellular mobile radio system; and FIG. 16 is a block diagram illustrating a mobile switching center in a cellular mobile radio system.

DETAILED DESCRIPTION OF THE PREFERRED EMBODIMENTS

According to the present invention, when a mobile station starts communicating with a certain base station, an estimate for an optimal initial time alignment parameter is made by the land system, either by the base station or by the mobile switching center and the corresponding correction is sent to the mobile station. In a preferred embodiment, the estimate is made by the base station. According to preferred embodiments of the present invention, the estimate may be done in several ways using information available to the land system before uplink bursts on a new voice channel, that is, bursts from the mobile station to the base station, are transmitted.

Figure 1:
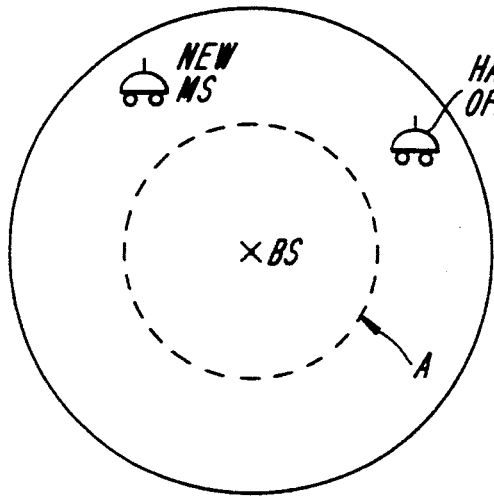
FIG. 1 illustrates a situation where a handed-off mobile station or a newly accessing mobile station enters a new cell where the mobile radial distance from a site is approximately known and cell geometries are known.

Two methods may be used during call initiations or in an inter-cell handoff situation (unless the new and old base stations are co-located). In a situation such as shown in FIG. 1, the knowledge of the cell geometries allows an initial time alignment parameter iTA to be defined which minimizes the probability of burst overlap between mobile stations. In a preferred embodiment, it can be assumed that a new mobile station or a handed-off mobile station is at a distance of one half the cell radius from the entered base station BS, represented in FIG. 1 by the dotted line A. The resulting estimate of an optimal time alignment parameter is a cell constant.

Figure 2:
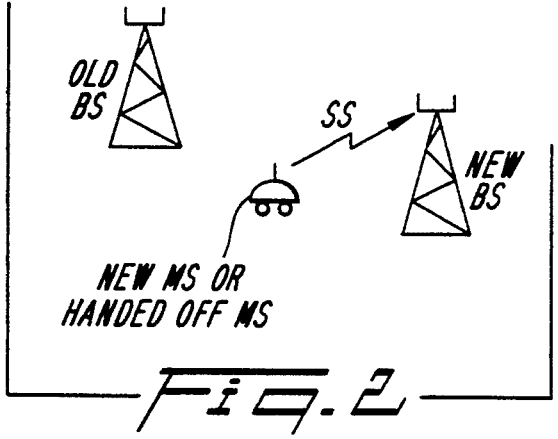
FIG. 2 illustrates a situation where a handed-off mobile station or a newly accessing mobile station enters a new cell for which not much is known about the mobiles location or cell geometries are unknown.

In a situation such as shown in FIG. 2, the base station measures the signal strength of the first uplink burst or bursts and the optimal time alignment parameter is a function of the measured signal strength. For example, the signal strength is measured for the access of a new mobile station on a control channel, or the signal strength measurements of the new base station prior to handoff to a digital traffic channel can be used. This allows calculation of the pathloss which can be used to estimate the distance to the base station. Equations for relating the pathloss to a distance are known which can take into account information about the type of topography, characteristics of the frequencies used, as well as the antennas heights and output power. One such propagation tool which can be used in a preferred embodiment of the present invention is described by Masaharu Hata in *IEEE Transactions on Vehicular Technology*, vol. VT-29, No. 3, August 1980, incorporated by reference herein. The resulting estimate of the optimal time alignment parameter is a function of the mobile station position or pathloss.

Figure 3:
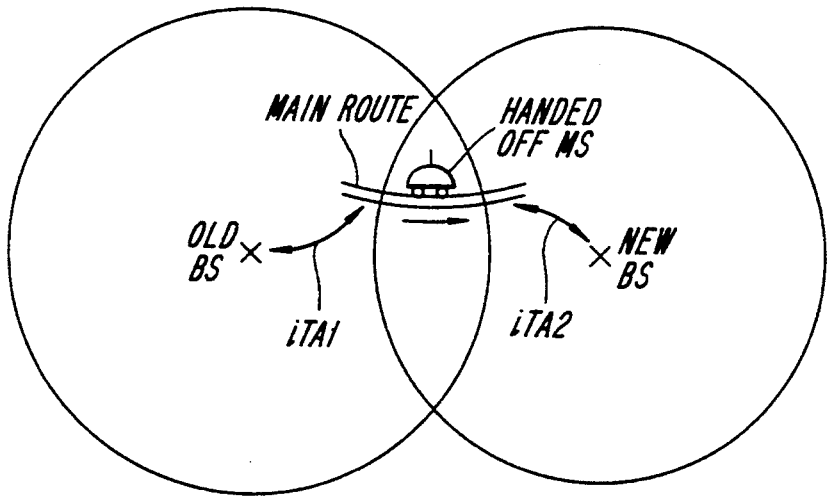
FIG. 3 illustrates a handoff between two overlapping cells.
Figure 4:
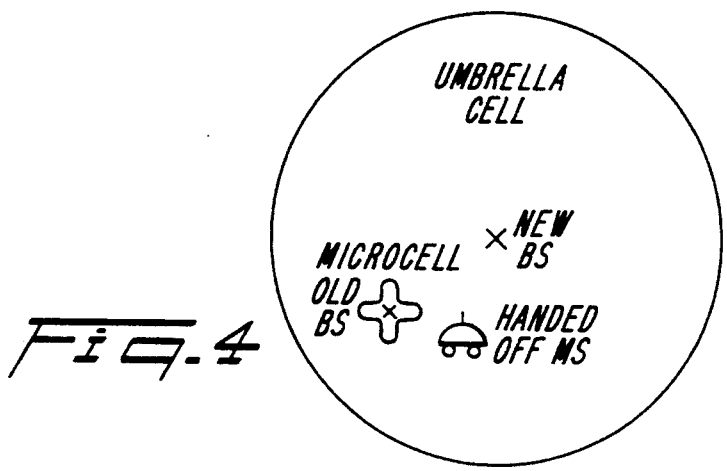
FIG. 4 illustrates a handoff of a mobile station from a micro-cell to an umbrella cell.

In an inter-cell handoff situation where the new and old base stations are not co-located, another method may be used. This method is not preferred when setting up new calls. In the situation shown in FIG. 3, the land system knows the old time alignment parameter and uses it to estimate the distance from the mobile station to the old base station. The land system also knows the cell geometries and the most probable route for the mobile station in the direction of the new cell, based on traffic measurements (i.e., highways through the cell). The estimate of the new optimal time alignment parameter is then a function of the mobile station position or pathloss. In the special situation illustrated in FIG. 4, where handoff is from a micro cell to a large umbrella cell, the location of the mobile station in the umbrella cell can be estimated with a large degree of certainty (since a micro-cell is relatively small in relation to an umbrella cell). The resulting estimate of an optimal time alignment parameter is thus a function of the micro-cell's position relative to the umbrella cell site which is known and can be defined as a cell constant.

Figure 5:
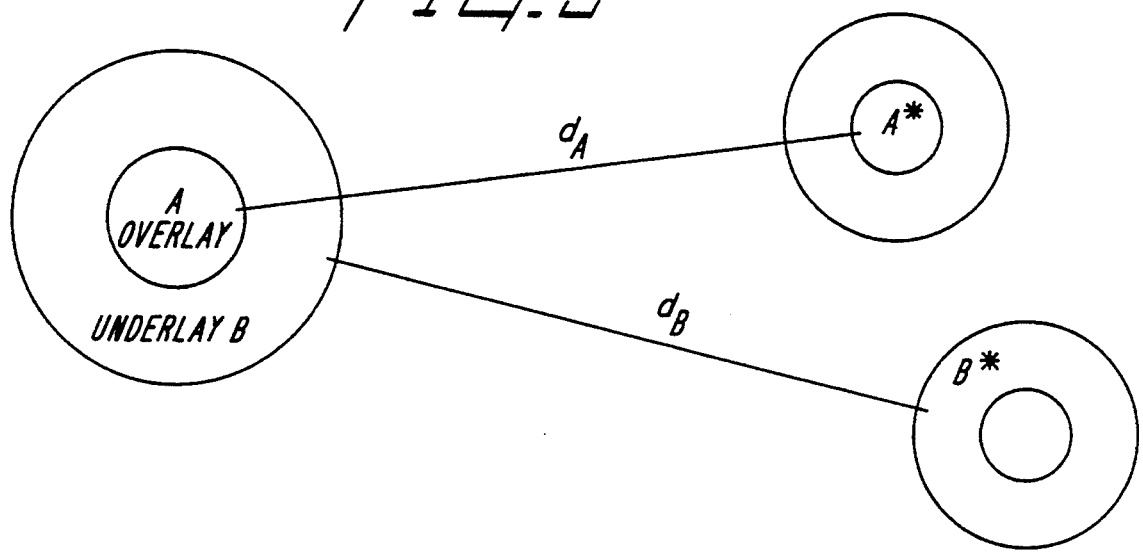
FIG. 5 illustrates an underlay cell and an overlay cell where reuse partitioning is used.
Figure 6:
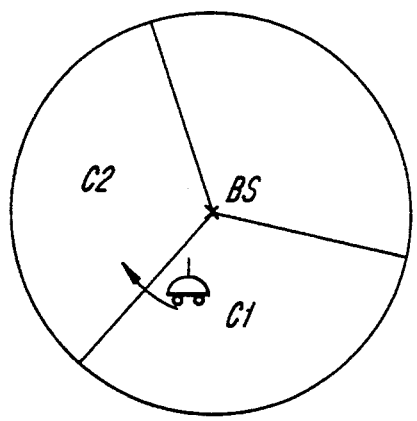
FIG. 6 illustrates handoff of a mobile station from sector to another sector within one base station.

In situations requiring handoff where the new and old base stations are co-located, the old time alignment parameter can be maintained because the distance to the base station does not change since the same base station is used. For example, this method may be used for handoff between underlay/overlay cells when using reuse partitioning as shown in FIG. 5, (where reuse distance $d_A$ is different from reuse distance $d_B$), for handoff between sector cells as shown in FIG. 6, or for intracell handoffs (handoff between voice/traffic channels in the same cell).

Figure 7:
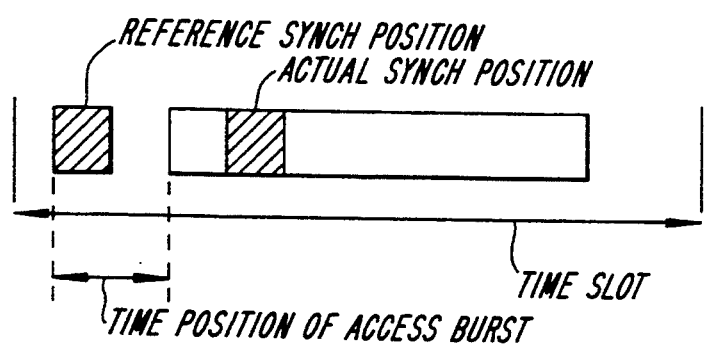
FIG. 7 illustrates a time slot on a digital control channel.

For setting up new calls, either originating or terminating calls, the base station measures the time position of the uplink access burst sent by the mobile without time alignment correction (an access burst on a digital control channel) as illustrated in FIG. 7. It is assumed, for this case, that time alignment control will not be a part of the digital control channel structure. So when the actual synch word position is detected to be shifted from the reference synch position, the amount of this shift can be directly translated into propagation delay or distance in a known manner. This distance can then be used on the new voice channel for the initial time alignment parameter iTA.

It is also possible to perform a combination of the methods described above for inter-cell handoff where the new and old base stations are not co-located and the method described for new calls to determine a new time alignment parameter. More detailed discussion of the methods according to the present invention follows.

The following definitions and abbreviations are used throughout this disclosure. The entry distance is a term used for the actual straight-line distance in kilometers between the mobile station which is being handed off and the new base station which is to receive the mobile station communication. The iTA is a temporary variable associated with the initial time alignment value. Its value is calculated from the entry distance and then inserted as the time alignment field in handoff and channel initialization messages. HOBANG is the handoff boundary angle relative to a straight line path between two neighboring cells. If the two neighboring cells are omni-directional, then a boundary angle of 90° can be assumed. This may not be true for two sectored cells intersecting at an angle. See FIG. 12. HODIST is a parameter that defines the handoff distance in kilometers into a specific cell from one of its neighbors. The defined distance may represent either the direct or the highest or average traffic route into the cell. ICDIST is a parameter that defines the total distance in kilometers between two neighboring sites. This can be determined directly from their site coordinates. PhLC is an abbreviation for 'physical layer control' which is one of the message types defined by IS-54 for the digital traffic channel.

FIGS. 8A and 8B are flow charts describing a first embodiment of the present invention. The flow charts of FIGS. 8A and 8B begin at the point where a handoff request is generated from either an analog or digital voice (traffic) channel and end at the point where a mobile uses the time alignment value sent with the handoff order.

As the first step in this method, the base station, upon determining that a handoff is necessary, sends the mobile switching center a handoff request (step 200). A processor in the mobile switching center MSC receives or determines possible candidate cells to receive the handoff (step 202). The MSC processor may then verify and select one of the candidates for handoff (step 204). At step 206, a channel in the candidate cell is selected for transmission. In the succeeding steps, the type of channel and cell is determined.

In particular, if the selected channel is determined to be an analog channel at step 208, the routine ends and no estimated time alignment parameter is determined. If the selected channel is digital, at step 208, it is determined whether the selected cell is the current cell at step 210. If so, control passes to step 232. If the selected cell is not the current cell at step 210, it is determined whether the selected cell is an overlay cell at step 212. If so, control passes to step 232. If the selected cell is not an overlay cell at step 212, it is determined whether the selected cell is an underlay cell in step 214. If it is, control passes to step 232. If the selected cell is not an underlay cell, it is determined whether the selected cell is an adjacent sector at step 216. If it is, control passes to step 232. If the selected cell is not an adjacent sector at step 216, it is determined whether the current channel is a digital channel at step 218.

If the current channel is digital at step 218, the parameters HODIST, ICDIST and HOBANG defined between the current cell and the candidate cell are fetched from a memory at step 220. This memory may be located either in the mobile switching center or in the base station. At step 222, the entry distance is estimated by using the HODIST, ICDIST and HOBANG parameters with the current time alignment value. At step 228, the variable iTA is set by converting the estimated entry distance to absolute time alignment units and the handoff order is sent at step 230 with the time aligned field equal to iTA. The time alignment value in the mobile is then shifted or set equal to the time align field of the handoff order, that is, to iTA at step 242.

At step 228, the entry distance is converted into time alignment units (or half-symbols), according to a preferred embodiment, by the following equation:

$$iTA = 2 + (1000 \times \text{entry distance}) / (C \times \text{bittime})$$

where: the factor of 2 expresses the roundtrip distance; 1000 is used to convert entry distance to meters; C is the speed of light in m/sec; and bittime is 1/48600 sec as defined by IS-54.

If it is determined that the current channel is not digital, at step 218, that is, the current channel is analog, the parameter HODIST defined between the current cell and the candidate cell is fetched from memory and the entry distance is estimated by using the HODIST parameter at step 226. The variable iTA is set at step 228 by converting the estimated entry distance to absolute time alignment units in accordance with the method described above. The handoff order as then sent, at step 230, with a time aligned field equal to iTA. At step 242, the time alignment of the mobile is set, or shifted, according to the value of iTA received by the mobile in the handoff order.

If any one of steps 210 through 216 is answered in the positive, it is determined whether the current channel is digital, at step 232. If the current channel is digital, the variable iTA is set to maintain the present timing offset at step 240 and the handoff order is sent at step 230 with the time aligned field equal to iTA. At step 242, the time alignment is set in the mobile according to iTA.

If the current channel is not digital at step 232, step 234 calculates the pathloss of the mobile station from the signal strength and power level. At step 236, all HODIST parameters defined between the current cell and its candidate cells are fetched from the memory and the entry distance is estimated at step 238 by using the HODIST parameters together with the handoff type and mobile station pathloss. At step 228, the variable iTA is set by converting the entry distance to absolute time alignment units and the handoff order at step 230 is sent with the time aligned field equal to iTA. The mobile sets its time alignment to iTA at step 242.

Figure 9:
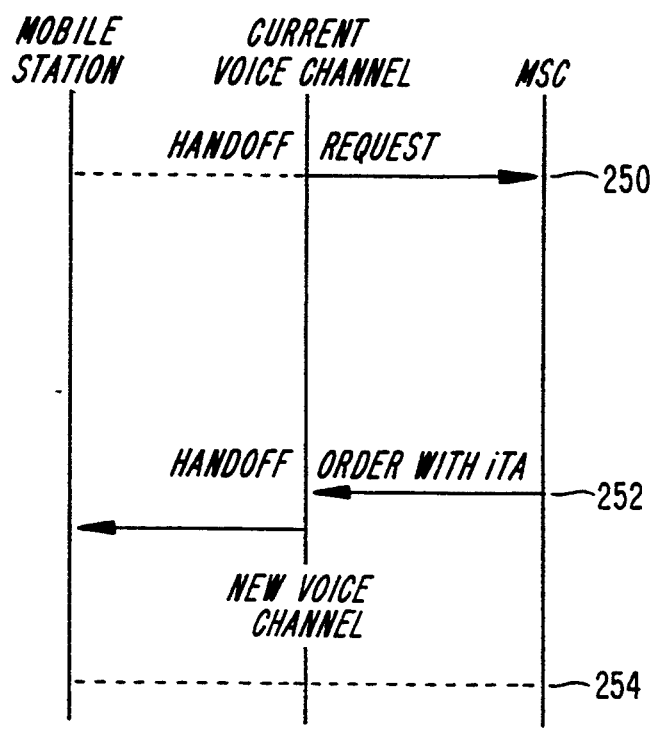
FIG. 9 is a signal description illustrating the system and air interface signalling performed with respect to initial time alignment during handoff.

FIG. 9 is a signal description which shows the system and interface signalling performed with respect to the initial time alignment during handoff. At 250, after determining that handoff is required, the base station sends a handoff request with handoff candidates. The mobile switching center evaluates the candidate list which leads to the selection of a cell and voice channel. For simplicity, voice channel and traffic channel may be used interchangeably in this description. The mobile switching center uses the current and the selected cell and the voice channel to determine how the iTA should be calculated. At 252, the mobile switching center sends the mobile a handoff order with the time alignment field equal to iTA and at 254, the mobile station begins transmission on the new voice channel using a time alignment of iTA.

Figure 10A:
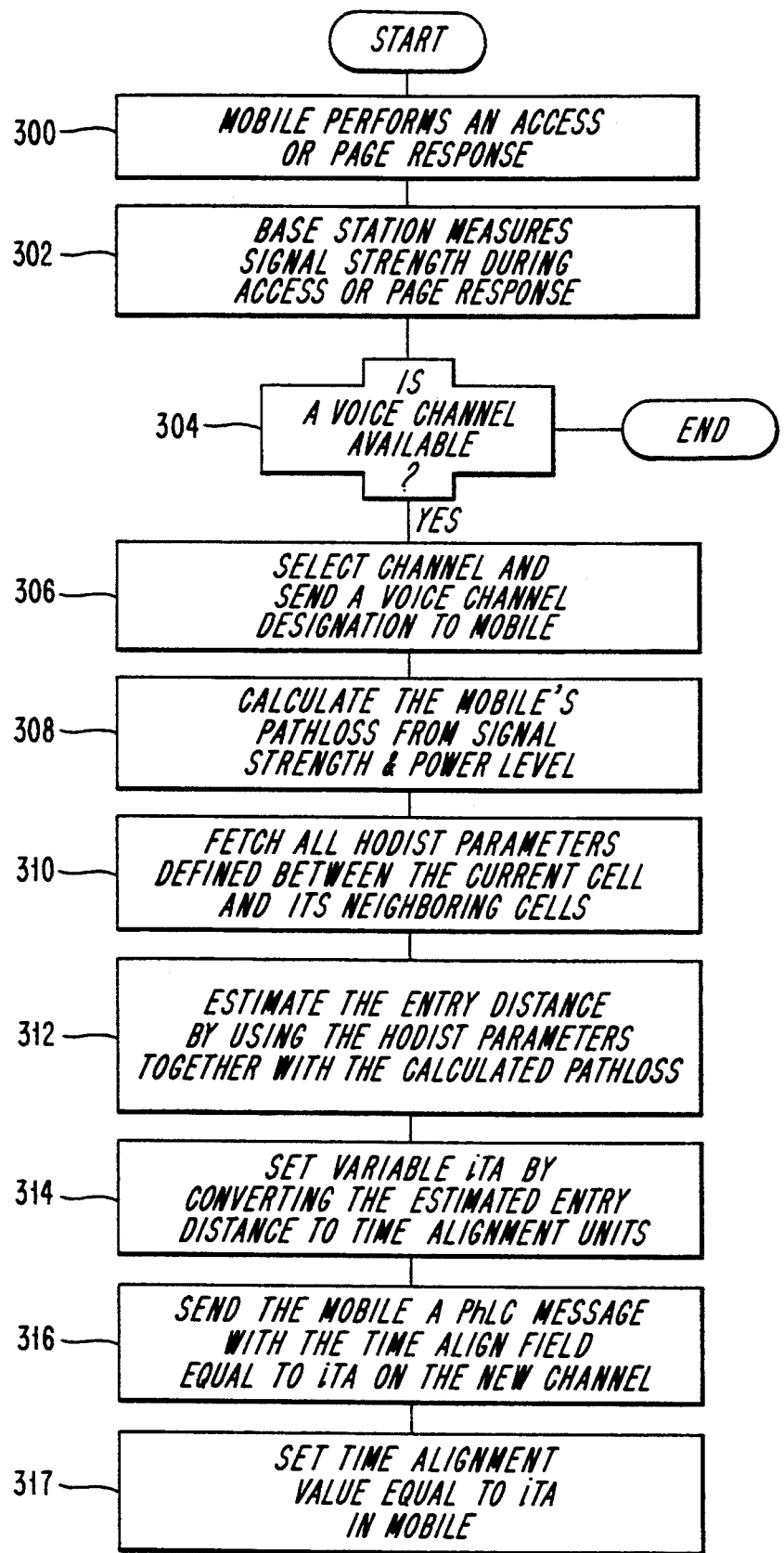
FIGS. 10A and 10B are flowcharts illustrating methods according to other embodiments of the present invention.
Figure 10B:
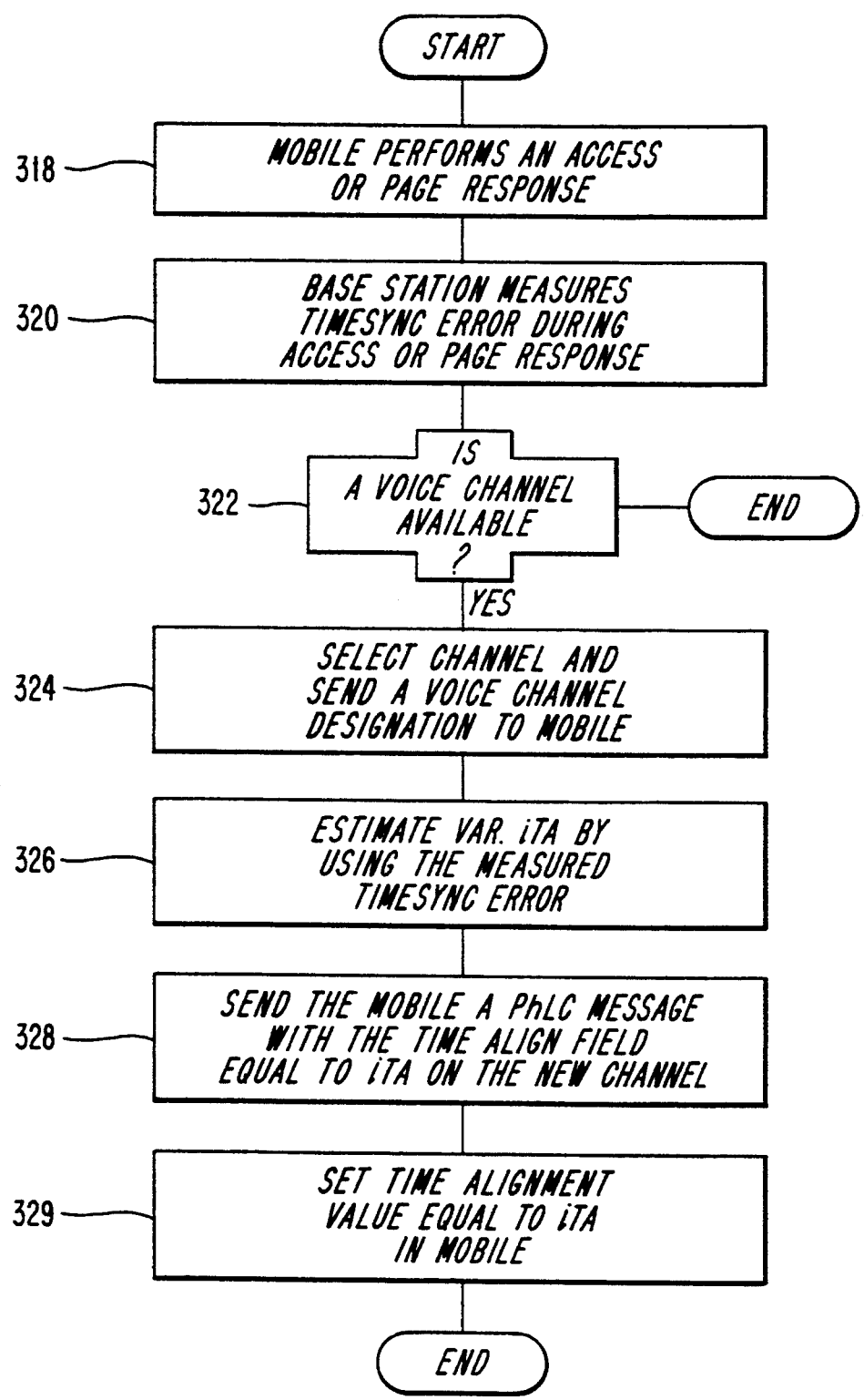

FIGS. 10A and 10B are flowcharts of a procedure according to a preferred embodiment of the present invention preferably carried out for initial time alignment determination during call setup. These flowcharts begin at the point where either an access or a page response is received and describe the processes that lead to the first time alignment adjustment on the new traffic channel. FIG. 10A is preferrably used for analog control channels and FIG. 10B is used for digital control channels.

FIG. 10A begins at step 300, where the mobile station performs an origination access request or paging response and the base station measures the signal strength of the access request or paging response signal at step 302. If no voice channel is available at step 304, the routine ends. If a voice channel is available, the channel is selected and a voice channel designation is sent to the mobile station at step 306. The pathloss of the mobile station is calculated from the signal strength measured by the base station and the given power level of the mobile, and the power level measured by the base station, at step 308. At step 310, all HODIST parameters defined between the current cell and its neighboring cells are obtained from memory. At step 312, the entry distance is estimated using the HODIST parameters together with a calculated pathloss. The variable iTA is set by converting the estimated entry distance to time alignment units at step 314, in accordance with the method described above. A PhLC message is sent to the mobile station with the time alignment field equal to iTA immediately on the new channel at step 316. At step 317, the mobile sets, or shifts, its time alignment value in accordance with the time align field received in the PhLC message.

As illustrated in FIG. 10B, which is preferably used for transmission on digital control channels, step 318, the mobile station performs an origination access request or page response and the base station measures the timesync error during the access request or paging response signal at step 320. If no voice channel is available at step 322, the routine ends. Otherwise, a channel is selected and a voice channel designation is sent to the mobile station at step 324. The variable iTA is estimated using the measured timesync error at step 326 and the mobile station is sent a PhLC message with the time align field equal to the iTA on the new channel at step 328. At step 329, the mobile sets, or shifts, its time alignment value in accordance with the time align field received in the PhLC message.

Figure 11:
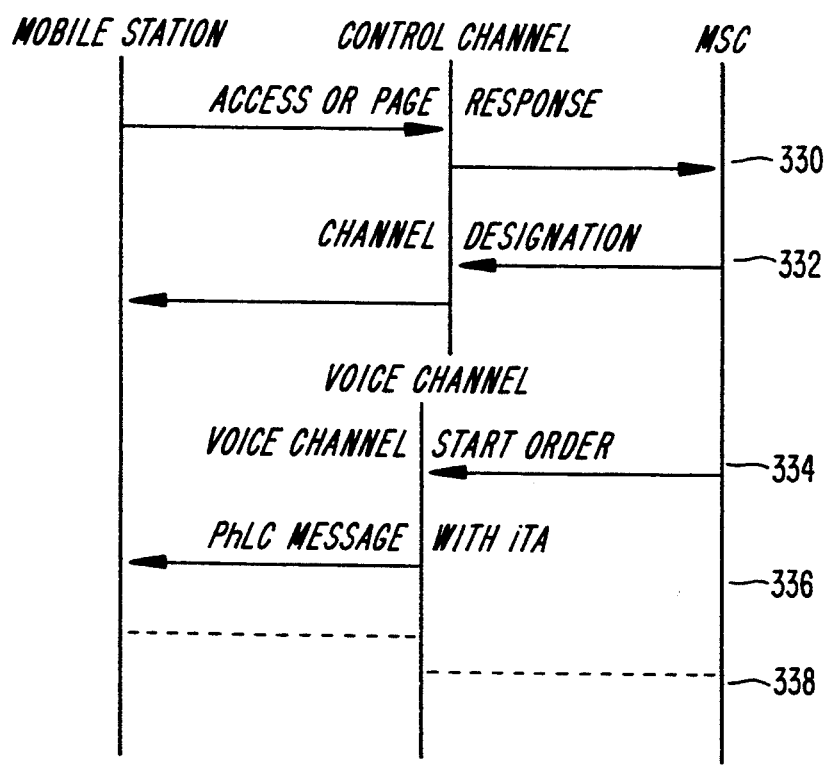
FIG. 11 is a signal description illustrating signals sent during call set up in cases of analog and digital control channels.

FIG. 11 illustrates a signal description which has been generalized to show the signal transmitted during call setup for both cases of analog or digital control channels. At 330, the signal strength or timesync error is measured by the base station. At 332, the voice channel is selected and seized by the mobile switching center. The mobile switching center then sends, at 334, the measurements of the signal strength or timesync error to the selected voice channel with the start order. At 336, the new voice channel estimates the iTA from the cell parameters and control channel measurements and at 338, the mobile station begins regular transmission using a time alignment of iTA.

The calculations performed according to the present invention as described above will now be discussed.

Figure 12:
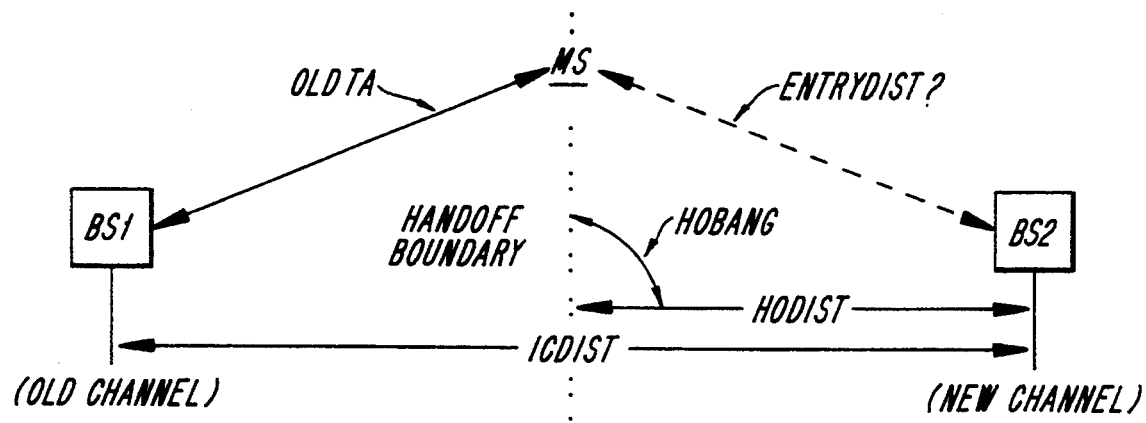
FIG. 12 illustrates a top view showing cell geometries and distances between two neighboring cells.

In FIG. 8b, step 222, the entry distance is estimated according to a preferred embodiment of the present invention in the following manner. The current (old channel) time alignment is known and used together with the cell parameters HODIST, ICDIST and HOBANG to calculate the entry distance. FIG. 12 illustrates a simplified approach to the problem of solving for the entry distance by having the handoff boundary angle (HOBANG) of 90°. However, even if the boundary angle is characterized by another HOBANG value, the entry distance can still be estimated by using the law of sines and cosines to solve for the unknown side length in terms of the known quantities in the triangle shown in FIG. 12. The following equation may be used;

$$X = \sqrt{S^2 + (V+U)^2 - 2s(V+U)\cos\left(\gamma - \sin^{-1}\left[\frac{v\sin(\gamma)}{s}\right]\right)}$$

where X is entry distance, S is the old time alignment TA, U is the HODIST parameter, V is ICDIST minus HODIST and $\gamma$ is HOBANG. This method could be used, for example, in the handoff case presented by FIG. 3 when the old time alignment value is available.

The entry distance is estimated at step 226 of FIG. 8b according to a preferred embodiment of the present invention in the following manner. When the current or old time alignment is unknown in FIG. 12, because the mobile is on an analog channel, then an estimate of the entry distance cannot be made by the method of step 222. Instead an estimate is made by assuming that the actual entry distance can be approximated by the cell parameter HODIST. This results in a tolerable error which can be further reduced by adjusting HODIST (or defining and using another parameter) to reflect the route of highest traffic. This method could be used, for example, for the handoff cases presented by FIGS. 1 and 3 when the old time alignment value is unavailable. This method is also a preferred method according to the present invention for the handoff case shown in FIG. 4 when the handoff distance between the micro-cell on the umbrella cell sites is a known constant.

At step 238 of FIG. 8b, the entry distance is estimated according to a preferred embodiment in accordance with the following method. This method is used when very little is known about the position of the mobile station. This may be the case, for example, when the old channel is analog and certain types of handoffs are performed. Specifically, this method may be appropriate in the handoff situations presented by between an overlay to an underlay cell, between two sectors, or intracell handoff. In the case of handoff between an underlay and an overlay cell or sector to sector handoff, the mobile station could be entering the cell from virtually any location along the cell boundary. Since the actual boundary, and hence the position of the mobile station will be highly influenced by the measured pathloss, the pathloss should be considered in addition to a standard handoff distance defined between the two cells or sectors. In other words, an estimate of the entry distance is calculated according to a preferred embodiment of the present invention as follows:

$$\text{ENTRYDIST} = \text{HODIST} + k1 \times \text{pathloss}$$

where: HODIST is defined between the overlay and underlay cells or between the two sectors; k1 is a constant that regulates the importance of pathloss; and pathloss is the difference between a known transmit power level and its corresponding received power level. The constant $k_1$ is determined by performing actual measurements or propagation predictions to correlate radial distance to pathloss. Thus, $k_1$ can be derived from the correlation factor between distance and pathloss.

Figure 13:
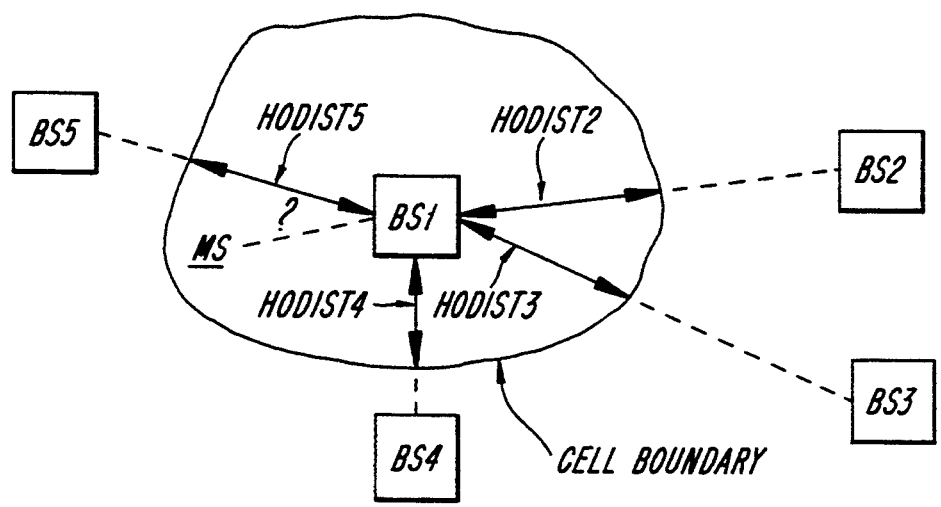
FIG. 13 illustrates a intracell handoff where distances can be estimated using known distances between neighboring cells.

For the case of intracell handoff, nothing is known about the position of the mobile station within the cell. In this case, an estimate can be obtained by taking a portion of the average cell size, mapped out by the handoff entry distances (HODISTs) into the cell. This can be seen with reference to FIG. 13, where BS1 is the current base station and BS2 through BS5 represent intracell neighbors. In FIG. 13, the cell size can be estimated as the average of HODIST 2 through HODIST 5. Since the mobile station could be anywhere in the region defined by the cell boundary, a fraction of the average cell size should be used according to the measured pathloss. This can be represented by the following equation:

$$ENTRYDIST = (k_2 \times pathloss) \times AVEHODIST$$

where: AVEHODIST is the cell size estimate calculated by averaging HODIST 1 through HODIST 5; and $k_2$ is a constant which scales down the cell size based on pathloss. The constant $k_2$ is determined in the same manner as $k_1$.

In step 240 of FIG. 8b, when the new cell or channel is known to share the same physical location as the old cell or channel, then the entry distance is already known from the current channel's time alignment and no calculation is necessary. The mobile station in this case should be instructed to continue maintaining the present timing offset following handoff. This method could be used for the handoff case as presented by FIGS. 5 and 6 when the old time alignment value is available and intracell handoff from a digital to a digital voice/traffic channel.

In FIG. 10A, at step 312, the entry distance can be estimated using the following method according to a preferred embodiment of the present invention. When a mobile station uses analog control channels to setup a call, little is known about the position of the mobile station within the accessed cell. However, the pathloss of the mobile station measured during an access request or paging response, can be used together with the average HODIST value into the cell in a manner similar to the method described with respect to FIG. 13 to estimate the entry distance. This can be used, for example, in situations shown in FIG. 2.

In FIG. 10B, step 326, the time alignment parameter iTA can be estimated as follows. Since it may be possible to directly measure the timesync error of the mobile station access request on a digital control channel, (see FIG. 7) the variable iTA can be calculated directly without reference to the entry distance or call setup distance.

Figure 14:
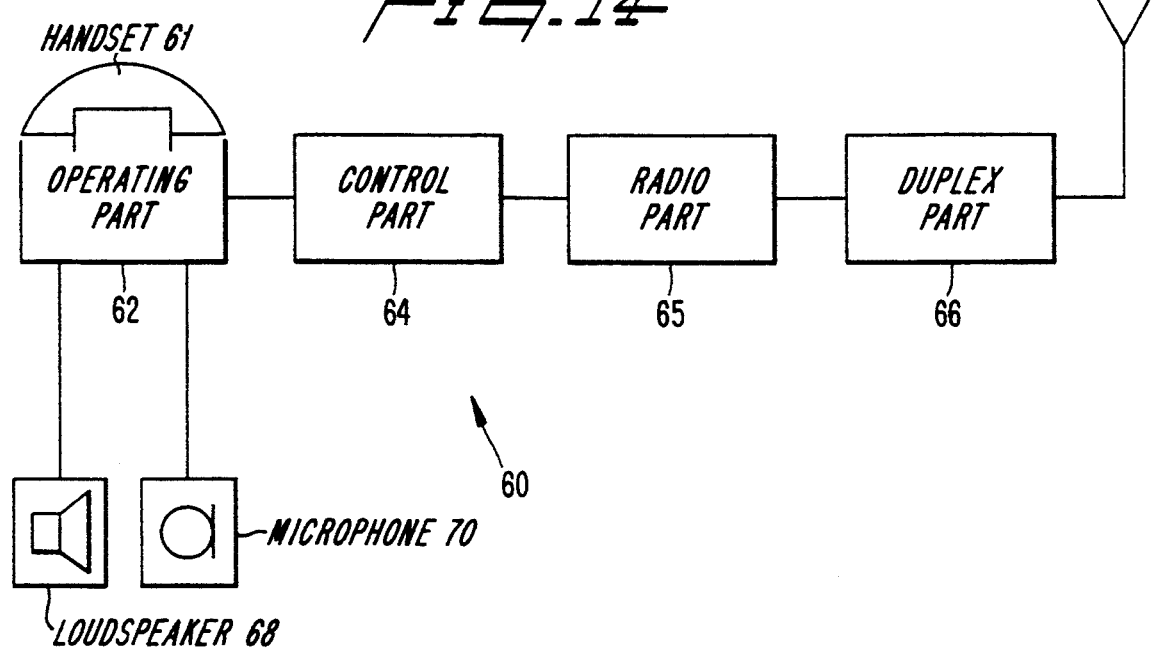
FIG. 14 is a block diagram illustrating a mobile station in a cellular mobile radio system.

FIG. 14 is a block diagram of the functional elements of a typical mobile station. The operating part 62 is controlled by a microprocessor and is often incorporated in the handset 61. The operating part 62 contains a push-button keypad and a display of dial digits (not shown). The sensing of the pressed keys in the operation of the display is handled by the above-mentioned microprocessor.

The control part 64, which is also based on a microprocessor, handles the following tasks. Control part 64 controls the data signalling on the radio path according to conventional protocols. Control part 64 also controls the radio part 65 to perform such operations such as selection of channels, start of transmit, opening of channel path, etc. Finally, the control part 64 controls communication with the operation part 62 as, for example, during reception of the dialed telephone number to be sent on the radio path. The control part 64 also controls the scanning of the control channels broadcast by the closest base stations to determine along which control channel communications are to occur.

The radio part 64 consists of a transmitter, receiver and power amplifier (not shown) and functions in a very similar way to the corresponding parts described in the base station. The duplex filter 66 is used for simultaneous transmission and reception via the same antenna on the radio path. Additionally, a loud speaker 68 and microphone 70 can be installed for hands-free operation.

Figure 15A:
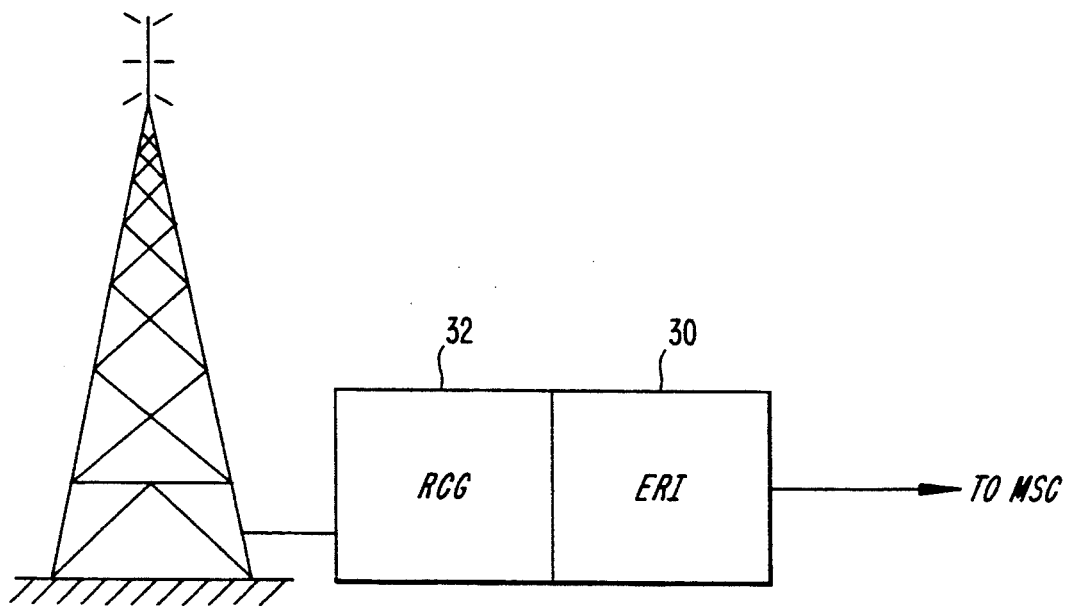

FIGS. 15A and 15B are block diagrams illustrating an example of a base station within a cellular mobile radio system. The base station is designed for transmission and reception on a plurality of radio channels used for digital communication channels, analog communication channels and control channels. The equipment configuration shown in FIG. 15B, i.e. one control channel, a number of voice channels, and one signal strength receiver, is a typical configuration of a radio channel group required to serve one cell. A typical base station shown in FIG. 15A comprises three major functional units: a radio channel group 32, exchange radio interface 30, and the power supply (not shown). The exchange radio interface 30 functions as a medium to signal between the mobile switching center and the base station. Thus, the equipment receives data from the channel units and sends this data to the mobile switching center on a dedicated mobile switching center to base station data link. In the reverse direction, the equipment receives data from the mobile switching center on the mobile switching center to a station data link and sends this data to the channel unit of destination. A voltage of 26.4 volts is normally provided as the distributed supply voltage to the base station from mains via analog AC/DC converters. A battery backup power supply is normally provided for continued service in the case of mains break down.

The radio channel group 32 holds all of the equipment normally needed to handle the radio communication with the mobile stations. A typical radio channel group 32, shown in FIG. 15B, comprises the following equipment: channel units 42, 44, a transmitter/combiner 46, receiver multi-couplers 48, a signal strength receiver 50, a control channel redundancy switch 52, a channel tester 54, a power monitoring unit 56 and an antenna system 58.

The channel units for the control channels 42 and for the voice channels 44 are identical. Each channel unit consists of a transmitter 440, a receiver 442 and a control unit 444 and a power amplifier (not shown) connected to the transmitter output. The output power determines the size of the coverage area of the channel in question. The particular power amplifier used is selected in order to obtain the required coverage for each cell. In addition, accurate adjustment of the output power may be manually performed.

A radio channel group can consist of a number of channel units, for example, 96 channel units. A radio base station can consist of one or more radio channel groups.

In typical configurations, the receiver multi-couplers 48 allow a number of channel receivers and signal strength receivers to be connected to the same receiver antenna. For example, up to 48 channel receivers and two signal strength receivers may be connected to the same receiver antenna.

The signal strength receiver 50 is implemented in a channel unit frame. It consists of a receiver 442 and a control unit 444. The signal strength receiver 50 measures the strength of the received signal (from the mobile stations) on any channel allocated to the neighboring cells. The relevant channel numbers as specified by the mobile switching center and the channels are continuously scanned one-by-one and samples of the measurements are stored in the control unit 444.

The transmitter combiner 46 allows a number of transmitters to be connected to a common antenna, for example, up to 16 transmitters can be connected to one antenna. The channel tester 54 performs mobile switching center operator controlled tests of the equipment. The power monitoring unit 56 is connected at the combiner output. It supervises the forward and reflected power and activates an alarm when, for example, the reflected power is too high. The antenna system comprises several alternative antenna configurations depending on the cell shapes required.

The control unit 444 used in the various channel units is based on a microprocessor with program stores implemented in the read/write memories. In a preferred embodiment, the portions of the method according to the present invention which occur in the base station are implemented in the microprocessor. The microprocessor can be any suitable commercially available microprocessor. The control unit performs a large number of functions, a number of which are relevant to this invention and are described herein. The remainder of the functions not discussed herein are considered not relevant to the present invention.

The control unit 444 controls the exchange of data messages between the mobile switching center and the mobile stations. Data to the mobile station is formatted with synchronization bits and an error correction pattern and is inserted into the transmitter. Data from the mobile station via the receiver 442 is detected and decoded and possible errors corrected prior to sending it to the mobile switching center. The control unit 444 also evaluates the signal strength measured by the receiver 442.

FIG. 16 is a block diagram of an example of a mobile switching center which can be used to implement the method according to the present invention. The mobile switching center shown in FIG. 16 is a simplified block diagram of some of the functional units in a mobile switching center. FIG. 16 shows but one example of a mobile switching center. Other systems may also be used.

The mobile switching center 70 is a highly modular system which includes a central processor 72 and a mobile telephone subsystem 74 for the cellular system which is integrated with the other subsystems. A group switching subsystem 76, a common channel signalling subsystem 78, and a trunk and signalling subsystem 80 are connected to the central processor 72. The mobile telephone subsystem 74 includes a regional processor 82, a mobile telephone base station line terminal 84 and a signalling terminal 86. The remaining subsystems also each include a regional processor 82.

The mobile telephone subsystem 74 handles all specific mobile subscriber functions, cellular network functions, as well as the signalling with the mobile stations. Subsystem 74 also provides the common channel signalling subsystem 78 with the necessary data from the mobile switching center signalling. The operation and maintenance functions specific for the cellular system are also implemented in the mobile telephone subsystem 74. The mobile telephone subsystem 74 includes the mobile telephone base station line terminals 84 which connect the mobile telephone subsystem 74 to the various base stations within the system and to the public switching telephone network. The signalling terminal 86 provided in the mobile telephone subsystem 74 handles data communication between the mobile switching center and the base stations. The regional processor 82 provided in each of the subsystems stores and executes the regional software for the switching system, handling simple, routine and high capacity tasks.

The group switching subsystem 76 is controlled by a traffic control subsystem (not shown). The group switching subsystem 76 sets up, supervises and clears connections through the group switch (not shown). The common channel signalling subsystem 78 contains functions for signalling, routing, supervision and correction of messages sent in accordance with a predetermined standard. The trunk and signalling subsystem 80 supervises the state of the trunk lines to the public switching telephone network and to the other mobile switching centers.

The central processor 72 stores and executes the central processor software for the switching system, handling the more complex functions. These functions include, but are not limited to, job administration, store handling, loading and changing of programs, etc. The regional processor 82 in the mobile telephone subsystem 74, in a preferred embodiment, implements those portions of the method according to the present invention, which occur in the mobile switching center. Alternatively, they may be implemented in the central processor 72. The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology of terminology employed herein is for the purpose of description and not of limitation.

What is claimed is:

1. A method in a cellular mobile radio system for initially setting a time alignment parameter in a mobile station comprising the steps of:
   estimating an optimal time alignment parameter before communication on a new traffic channel of a desired base station is established, for use during communication on the new traffic channel based on information relating to the position of the mobile station available before the communication on the new traffic channel is established;
   sending the estimated time alignment parameter to the mobile station; and
   setting the time alignment parameter in the mobile station in accordance with the estimated time alignment parameter.

2. The method according to claim 1, wherein the step of estimating is performed upon receipt of a handoff request and the estimated time alignment parameter is sent with the handoff order.

3. The method according to claim 1, wherein the step of estimating is performed upon receipt of an access request or paging response and the estimated time alignment parameter is sent with a physical layer control message on the new traffic channel.

4. The method according to claim 2, wherein the information available used to estimate the optimal time alignment parameter is a handoff boundary angle value, a handoff distance value, a total distance value and a current time alignment value.

5. The method according to claim 2, wherein the information available used to estimate the optimal time alignment parameter is a handoff distance value.

6. The method according to claim 2, wherein the information available used to estimate the optimal time alignment parameter is a pathloss value and at least one handoff distance value.

7. The method according to claim 2, wherein the information available used to estimate the optimal time alignment parameter is a current time alignment value.

8. The method according to claim 3, wherein the information available used to estimate the optimal time alignment parameter is a pathloss value and at least one handoff distance value.

9. The method according to claim 3, wherein the information available used to estimate the optimal time alignment parameter is a measured timesync error value.

10. A method in a cellular mobile radio system for sending a time alignment value to a mobile station in a handoff order or physical layer control message, said method comprising the steps of:

estimating an optimal time alignment parameter before communication on a new traffic channel of a desired base station is established, for use during communication on the new traffic channel based on information relating to the position of the mobile station available before the communication is established; and sending the estimated time alignment parameter to the mobile station in the handoff order or physical layer control message.

11. The method according to claim 10, wherein the information available used to estimate the optimal time alignment parameter is a handoff boundary angle value, a handoff distance value, a total distance value and a current time alignment value.

12. The method according to claim 10, wherein the information available used to estimate the optimal time alignment parameter is a handoff distance value.

13. The method according to claim 10, wherein the information available used to estimate the optimal time alignment parameter is a pathloss value and at least one handoff distance value.

14. The method according to claim 10, wherein the information available used to estimate the optimal time alignment parameter is a current time alignment value.

15. An apparatus in a cellular mobile radio system having a plurality of cells, for initially setting a time alignment parameter in a mobile station comprising:

means for estimating an optimal time alignment parameter before communication on a new traffic channel of a desired cell is established, for use during communication on the new traffic channel based on information relating to the position of the mobile station available before the communication is established;

means for sending the estimated time alignment parameter to the mobile station; and means for setting the time alignment parameter in the mobile station in accordance with the estimated time alignment parameter.

16. An apparatus in a cellular mobile radio system for sending a time alignment value to a mobile station in a handoff order or physical layer control message, said apparatus comprising:

means for estimating an optimal time alignment parameter before communication on a new traffic channel of a desired base station is established, for use during communication on the new traffic channel based on information relating to the position of the mobile station available before the communication is established; and means for sending the estimated time alignment parameter to the mobile station in the handoff order or physical layer control message.

* * * * *